(12) United States Patent
Kimbrell (10) Patent No.: US 9,690,306 B2
(45) Date of Patent: Jun. 27, 2017

(54) DISPLAY INTERFACE TEMPERATURE COMPENSATION

(71) Applicant: BlackBerry Limited, Waterloo (CA)

(72) Inventor: Jacob Warren Kimbrell, Cary, NC (US)

(73) Assignee: BlackBerry Limited, Waterloo, Ontario (CA)

( * ) Notice: Subject to any disclaimer, the term of this patent is extended or adjusted under 35 U.S.C. 154(b) by 860 days.

(21) Appl. No.: 14/069,462

(22) Filed: Nov. 1, 2013

(65) Prior Publication Data

US 2015/0127187 A1    May 7, 2015

(51) Int. Cl.
| | | |
|---|---|---|
| G05D 23/00 | (2006.01) | |
| G05D 23/19 | (2006.01) | |
| G09G 5/00 | (2006.01) | |
| G06F 1/20 | (2006.01) | |
| H04L 25/02 | (2006.01) | |

(52) U.S. Cl.
CPC ........... *G05D 23/192* (2013.01); *G06F 1/203* (2013.01); *G09G 5/006* (2013.01); *H04L 25/0276* (2013.01); *G09G 2320/041* (2013.01)

(58) Field of Classification Search
CPC .................................................. G05D 23/192
USPC ......................................................... 700/278
See application file for complete search history.

(56) References Cited

U.S. PATENT DOCUMENTS

| | | | | |
|---|---|---|---|---|
| 4,608,649 A | * | 8/1986 | Davis | G06F 17/5068 257/E27.107 |
| 6,602,729 B2 | * | 8/2003 | Lin | G01N 27/92 257/E21.531 |
| 6,704,818 B1 | * | 3/2004 | Martin | H03K 17/164 710/100 |
| 7,248,635 B1 | | 7/2007 | Arneson et al. | |
| 7,553,075 B2 | | 6/2009 | Hsu et al. | |
| 8,094,684 B2 | * | 1/2012 | Lu | G09G 5/003 370/293 |
| 8,195,107 B2 | | 6/2012 | Kim | |
| 8,415,986 B2 | * | 4/2013 | Seth | H03K 19/018521 326/30 |
| 8,692,751 B2 | * | 4/2014 | Choi | G09G 3/3696 345/87 |
| 9,197,340 B2 | * | 11/2015 | Kabiry | H04J 3/02 |

(Continued)

FOREIGN PATENT DOCUMENTS

WO    2013055510    4/2013

OTHER PUBLICATIONS

European Examination report dated Aug. 4, 2016, received for European Application No. 14191244.4.

(Continued)

*Primary Examiner* — Christopher E Everett
(74) *Attorney, Agent, or Firm* — Jon Gibbons; Fleit Gibbons Gutman Bongini & Bianco P.L.

(57) ABSTRACT

A method of adjusting port parameters. A source device establishes an initial output voltage swing and an emphasis level for output signals from a display port interface as a result of executing a link training process with a target device. A processor determines that a prescribed temperature threshold has been exceeded by a source device temperature. The output voltage swing and emphasis levels are set to different output voltage swing and emphasis levels as a consequence of determining that the prescribed temperature threshold has been exceeded.

21 Claims, 7 Drawing Sheets

(56) References Cited

U.S. PATENT DOCUMENTS

| | | |
|---|---|---|
| 2005/0259496 A1 | 11/2005 | Hsu et al. |
| 2006/0091935 A1 | 5/2006 | Tschanz et al. |
| 2009/0040163 A1* | 2/2009 | Sun ................. G09G 3/3696 345/98 |
| 2009/0179682 A1* | 7/2009 | Khoury ............ H04L 25/03878 327/306 |
| 2009/0279473 A1 | 11/2009 | Lu et al. |
| 2010/0062720 A1 | 3/2010 | Kim |
| 2011/0016332 A1 | 1/2011 | Wu et al. |
| 2013/0155073 A1 | 6/2013 | Khodorkovsky et al. |
| 2015/0127187 A1* | 5/2015 | Kimbrell ............... G09G 5/006 700/299 |

OTHER PUBLICATIONS

Extended European Search Report dated Mar. 3, 2015 for European Application No. 14191244.4.

\* cited by examiner

| CURRENT LEVEL | NEXT LEVEL |
|---|---|
| 0-0 | 0-1 |
| 0-1 | 0-2 |
| 0-2 | 0-3 |
| 0-3 | 1-0 |
| 1-0 | 1-1 |
| 1-1 | 1-2 |
| 1-2 | 2-0 |
| 2-0 | 3-0 |
| 2-1 | 2-1 |
| 3-0 | 2-1 |

FIG. 8

| CURRENT LEVEL | NEXT LEVEL |
|---|---|
| 0-0 0-1 | 0-2 |
| 0-2 0-3 | 1-1 |
| 1-0 1-1 1-2 | 2-0 |
| 2-0 2-1 3-0 | 2-1 |

DISPLAY INTERFACE TEMPERATURE COMPENSATION

BACKGROUND

Electronic devices such as smartphones and the like can generate substantial amounts of heat during charging operations. Additionally, computationally intensive operations, including receiving and/or transmitting data, can also cause substantial heat generation. Such heat can affect the ability of the device to properly communicate over various display interfaces. DisplayPort™ and Mobility DisplayPort™ (MyDP™) (trademarks of the Video and Electronics Standards Association (VESA®)), are digital display interfaces that were developed to provide high-definition and 3D video and audio content communication between devices. MyDP is a subset of DisplayPort, and is specifically applicable to mobile phone applications. DisplayPort was designed for the personal computer market.

Since performance of smartphone electrical components is temperature sensitive, the heat generated in the smartphone can negatively affect the communication of video data. This can result in jitter, data errors, poor eye patterns and other undesirable consequences. In MyDP standard compliant devices, this problem is often exacerbated when receiving a charging current from a connected device.

BRIEF DESCRIPTION OF THE DRAWINGS

Illustrative embodiments of the present disclosure will be described below with reference to the included drawings such that like reference numerals refer to like elements and in which.

DETAILED DESCRIPTION

The various embodiments disclosed herein outline methods, interfaces, and electronic devices that adjust display port transmission characteristics to compensate for temperature.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments shown and described herein.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or "application" or "app" or similar terms, as used herein, is defined as a sequence of instructions designed for execution on a computer system. A "program", or "computer program", may include a subroutine, a function, a procedure, an object method, an object implementation, in an executable application, "app", an applet, a servlet, a source code, an object code, a shared library/dynamic load library and/or other sequence of instructions designed for execution on a computer system. The term "processor", "controller", "CPU", "computer" and the like as used herein encompasses both hard programmed, special purpose, general purpose and software or firmware programmable devices and may encompass a plurality of such devices or a single device in either a distributed or centralized configuration without limitation.

Reference throughout this document to "one embodiment", "certain embodiments", "an embodiment", "an illustration", "an implementation", "certain examples" or similar terms means that a particular feature, structure, or characteristic described in connection with the embodiment or implementation is included in at least one embodiment or implementation of the present invention. Thus, the appearances of such phrases or in various places throughout this specification are not necessarily all referring to the same embodiment or implementation. Furthermore, the particular features, structures, or characteristics may be combined in any suitable manner in one or more embodiments or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In method of adjusting port parameters consistent with the present teachings, a source device establishes an initial output voltage swing and an emphasis level for output signals from a display port interface as a result of executing a link training process with a target device. A processor determines that a prescribed temperature threshold has been exceeded by a source device temperature. The output voltage swing and emphasis levels are set to different output voltage swing and emphasis levels as a consequence of determining that the prescribed temperature threshold has been exceeded.

A method consistent with the present teachings involves: at a source device, establishing an initial output voltage swing and an initial emphasis level for output signals from a display port interface as a result of executing a link training process with a target device; at one or more processors, determining that a prescribed temperature threshold has been exceeded by a source device temperature of the source device; at the one or more processors, responsive to determining that the prescribed temperature threshold has been exceeded, setting the output voltage swing and emphasis level to different output voltage swing and emphasis levels.

In certain implementations, the different output voltage swing and emphasis levels comprise a maximum output voltage swing and emphasis levels permitted by the target device interface. In certain implementations, the different output voltage swing and emphasis levels are selected by reference to a map stored in a memory, and a map entry point is the initial output voltage swing and emphasis levels. In certain implementations, the different output voltage swing and emphasis levels are selected by traversing a decision tree. the prescribed temperature threshold can be a prescribed one of a plurality of temperature thresholds; and the different output voltage swing and emphasis levels can be one of a plurality of selectable output voltage swing and emphasis levels, with each of the plurality of different output voltage swing and emphasis levels being incrementally larger in either swing or emphasis level than the initial output voltage swing and emphasis level.

In certain implementations, the display port interface is configured to receive charging current and to provide the charging current to a battery for powering the source device. In certain implementations, the display port interface can be a Mobility DisplayPort physical layer, swing and emphasis compliant display port interface. In certain implementations, the different output voltage swing and emphasis levels are an output voltage swing of approximately 600 millivolts nominal, and the emphasis level is approximately 3.5 dB nominal.

In certain implementations, the different output voltage swing and emphasis level is an output voltage swing of approximately 600 millivolts nominal, and the emphasis level is approximately 3.5 dB nominal. In certain implementations, the source device temperature is a temperature measured by one or more temperature sensors. In certain implementations, the source device temperature can be a calculated temperature proxy value, and the temperature threshold can be a temperature threshold proxy value.

A source device consistent with the present teachings has a display port interface. One or more processors control operation of the display port interface. The one or more processors are programmed to: establish an initial output voltage swing and an initial emphasis level for output signals from the display port interface as a result of executing a link training process with a target device; determine that a prescribed temperature threshold has been exceeded by a source device temperature; and set the output voltage swing and emphasis level to different output voltage swing and emphasis levels responsive to determining that the prescribed temperature threshold has been exceeded.

In certain implementations, the different output voltage swing and emphasis levels comprise maximum output voltage swing and emphasis levels permitted by the target device interface. In certain implementations, the different output voltage swing and emphasis levels are selected by reference to a map stored in a memory, and a map entry point is the initial output voltage swing and emphasis levels. In certain implementations, the different output voltage swing and emphasis levels are selected by traversing a decision tree. In certain implementations, the prescribed temperature threshold is a prescribed one of a plurality of temperature thresholds; and the different output voltage swing and emphasis levels are one of a plurality of selectable output voltage swing and emphasis levels, with each of the plurality of different output voltage swing and emphasis levels being incrementally larger in either swing or emphasis level than the initial output voltage swing and emphasis.

In certain implementations, the display port interface is configured to receive charging current and to provide the charging current to a battery residing in the source device. In certain implementations, the display port interface can be a Mobility DisplayPort physical layer, swing and emphasis compliant display port interface. In certain implementations, the different output voltage swing and emphasis levels can be an output voltage swing of approximately 600 millivolts nominal, and the emphasis level can be approximately 3.5 dB nominal. In certain implementations, the different output voltage swing and emphasis level is an output voltage swing of approximately 600 millivolts nominal, and the emphasis level is approximately 3.5 dB nominal. In certain implementations, the source device temperature can be a measured temperature measured by one or more temperature sensors. In certain implementations, the source device temperature can be a calculated temperature proxy value, and the temperature threshold can be a temperature threshold proxy value.

A source device consistent with the present teachings has one or more temperature sensors. A DisplayPort physical layer, swing and emphasis compliant display port interface is configured to receive charging current and to provide the charging current to a battery. One or more processors control operation of the display port interface. The one or more processors is programmed to: establish an initial output voltage swing and an initial emphasis level for output signals from the display port interface as a result of executing a link training process with a target device; determine that a prescribed temperature threshold has been exceeded by a source device temperature as measured by the one or more temperature sensors; and set the output voltage swing and emphasis level to different output voltage swing and emphasis levels as a consequence of determining that the prescribed temperature threshold has been exceeded, where the different output voltage swing and emphasis levels are either an output voltage swing of approximately 600 millivolts nominal and the emphasis level of approximately 3.5 dB nominal, or a maximum output voltage swing and emphasis levels accepted by the target device.

In the present document, a mobile device such as a telephone, smartphone, tablet or the like, that supplies video or audio/video output to another device is considered a "source device." The recipient device that receives the audio/video output, such as a TV or display monitor, is considered a sink or "target device." Such references are used interchangeably herein. The DisplayPort™ standard specification uses the terms "upstream device" and "downstream device," where the upstream device generally corresponds to the source device. The downstream device generally refers to a display, but may also refer to a display interposer accessory situated between the source and the target devices. Hence, while the embodiments presented herein represent a source device coupled directly to a sink device, the discussion and teachings herein are equally applicable to an arrangement where the actual sink device (with respect to the source device) may be an intermediate device receiving the actual signals sent from the source. Similarly, an actual source device (with respect to the sink device) may be an intermediate device.

The term 'display port' is used herein to generically refer to an interface that has signals that communicate with a display/target device. But, this is not to be considered limiting since the interface can also be configured to connect with other devices. This "display port" is not necessarily limited to and should not be confused with the DisplayPort™ standard, which embodies but one type of display port. The display port is connected to the source device via a docking station, or a special or standard connector. Special connectors can be used to convey many types of signals including, but not limited to, audio/video data streams, charging current, and USB traffic, IEEE 1394 traffic, etc.

It is also noted that certain actual products may not be fully DisplayPort or Mobility DisplayPort standard compliant. The discussion that follows is applicable to devices in which the physical layer and all of the voltages, swings and emphasis specifications discussed below may be compliant, while the actual product may not be 100% MyDP standard compliant.

Mobile devices may generate substantial amounts of heat during operation. The device may be charging at a high current rate (e.g., as much as 2-3 Amps for current technology batteries) and may also draw substantial current during operation (e.g., as much as 2 Amps at times). This amount of current moving through the device generates heat, and in addition, other operations executing or running in the device can generate heat. This heat can impact signal integrity in various systems (eye opening, jitter, data errors) which can lead to various types of failures or increased error rates.

When a mobile device (source device) is connected to certain display accessories or a docking station via a display port, a link training process begins to establish operational characteristics of the device as it transmits streaming video data downstream to a connected display (sink or target device). This training process sets the appropriate wave form characteristics of the signal to be transmitted. The peak to peak or swing level coupled with an amount of emphasis is set as a result of the training. Once trained, the device proceeds with normal operation using this swing level and emphasis during its operation (e.g., internet browsing, rendering photos, playing video, as well as other actions) while charging.

All of this can detrimentally generate a substantial amount of heat in the device. A MyDP interface (for example) which is transmitting audio/video data to a downstream device such as a display device may degrade its ability to transmit reliably and become compromised due to excessive heat. In certain implementations, an integrated circuit (IC) is used to translate High Definition Multimedia Interface (HDMI) compatible data into data suitable for transmission using the MyDP interface as a source. This data is then output from the MyDP interface to a connector that can be implemented as a dedicated connector, a unified connector, docking station or other suitable connector. Generally, in order to continue to provide reliable transport of data from the MyDP port, the transmission parameters should be adjusted to provide additional swing and emphasis for the display or other downstream target device (sink) to detect the proper signal.

In accord with the present teachings, a temperature measurement or calculation is used to determine when to override the swing and emphasis parameters set during initial link training (or a subsequent adjustment). In a simple implementation, temperature sensors that are already placed inside the device are monitored. In other implementations heat calculations or calculations related to heat can be used, such as for example, monitoring the charge current and amount of charging time to calculate a proxy for temperature based on prior observation. In other embodiments, monitoring the application processors memory usage can be employed to estimate the heat generated by the device. One or more thresholds are established, for example, 62 degrees C., and once this level is detected the interface circuitry updates the swing and emphasis so that audio/video (A/V) streaming may be reliably sustained.

In the illustrative embodiments below, the DisplayPort and Mobility DisplayPort are used as specific illustrations of a display port, but this is not intended to be limiting since the present teachings may also be applicable to other display ports.

Figure 1:
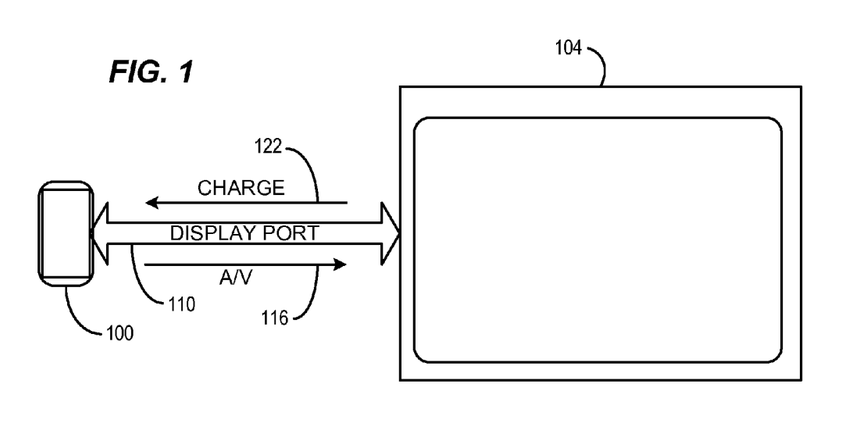
FIG. 1 is an illustration of an illustrative electronic device 100 coupled to a display in accordance with aspects of the present disclosure.

FIG. 1 is an illustration of an illustrative electronic device 100 (e.g., a smartphone) coupled to a display 104 via a MyDP interface connection 110 in accordance with aspects of the present disclosure. In the case of the MyDP interface (as well as others), A/V data 116 are sent from source device 100 to the display 104 for rendering, while in some instances charging current 122 passes from the display 104 or other sink device to the source device 100. As a result, the device 100 may be operating in a manner that simultaneously uses large amounts of processing power while charging the battery. Both of these operations can result in an increase in heat of the device 100. This heat increase can in turn cause the circuitry generating A/V output data to the sink device 104 to become distorted and less reliable for error free transmission. It is noted that other signals may be transmitted across the display port bus connection 110, but the details of such signalling are not generally significant to the present discussion and thus not discussed in any detail.

Figure 2:
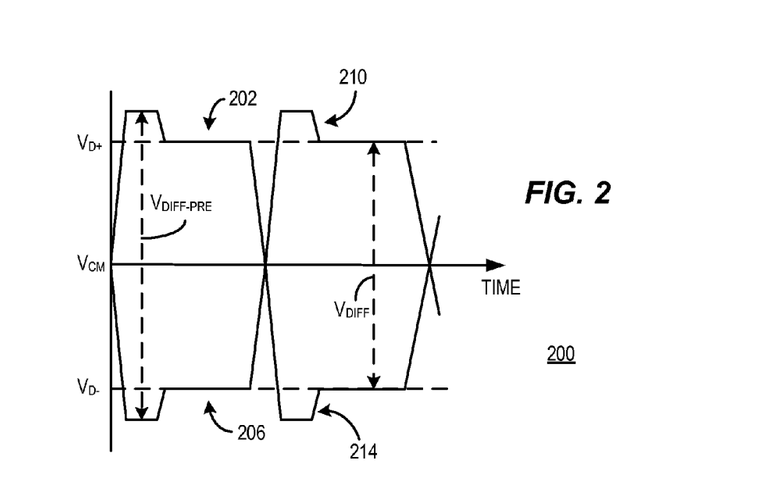
FIG. 2 is a graph depicting an illustrative signal waveform as transmitted over the display interface in a manner consistent with aspects of the present disclosure.

In communication of A/V data from the source device 100 to a target device such as 104 via a MyDP display port (by way of non-limiting embodiment), the output signals may have characteristics similar to those illustrated in FIG. 2 on graph 200. In this illustration, a differential output signal is depicted having a common mode voltage level of $V_{CM}$. The output "swing" is defined by the voltage level $V_{DIFF}$ which is the differential voltage between $V_{D+}$ 202 and $V_{D-}$ 206. Due to the tendency of the transmission cable between the source and sink to introduce a smearing of the pulses that diminishes the leading edge of the pulses, it has been found helpful to add an amount of emphasis (also called preemphasis) to the leading edge of the pulses, which amounts to increasing the signal level of the pulses (e.g., at 210 and 214) for a short time at the beginning of the pulse. This level is depicted as $V_{DIFF-PRE}$ in 200. Limits on the swing $V_{DIFF}$ as well as the emphasis for this particular implementation are defined in the MyDP specification as it relates to the MyDP interface. Other interfaces may have differing specifications for swing and emphasis. For this implementation, the emphasis level is expressed in decibels as:

$$\text{Emphasis}=20\ \log_{10}(V_{DIFF-PRE}/V_{DIFF}).$$

Again using the MyDP interface as an illustration, there are several levels of swing and emphasis that are permitted by the specification, but which are implementation specific and can vary. These values are tabulated for illustrative purposes as nominal values in the TABLE below.

TABLE

|  | Emphasis level 0 0 dB | Emphasis level 1 +3.5 dB | Emphasis level 2 +6.0 dB | Emphasis level 3 +8.0 dB |
| --- | --- | --- | --- | --- |
| Swing level 0 200 mV | Level 0-0 Required | Level 0-1 Required | Level 0-2 Required | Level 0-3 Optional |
| Swing level 1 400 mV | Level 1-0 Required | Level 1-1 Required | Level 1-2 Required | NOT PERMITTED |

TABLE-continued

|  | Emphasis level 0 0 dB | Emphasis level 1 +3.5 dB | Emphasis level 2 +6.0 dB | Emphasis level 3 +8.0 dB |
|---|---|---|---|---|
| Swing level 2 600 mv | Level 2-0 Required | Level 2-1 Required | NOT PERMITTED | NOT PERMITTED |
| Swing level 3 800 mV | Level 3-0 Optional | NOT PERMITTED | NOT PERMITTED | NOT PERMITTED |

In the above TABLE, it is noted that required levels (as required by the DisplayPort specification in order to be compliant with the swing, emphasis and physical layer of the specification) include as the highest combination of swing level and emphasis as Level 2-1. While Level 3-0 and Level 0-3 are permitted as optional, it is not universally allowable. Hence, for purposes of the present discussion, it is noted that Level 2-1 is a level that is currently believed most likely to universally produce the highest reliability and compatibility in the A/V stream transmitted downstream from source to sink. In other devices, the swing level and emphasis levels may be defined differently than those defined in the TABLE.

Figure 3:
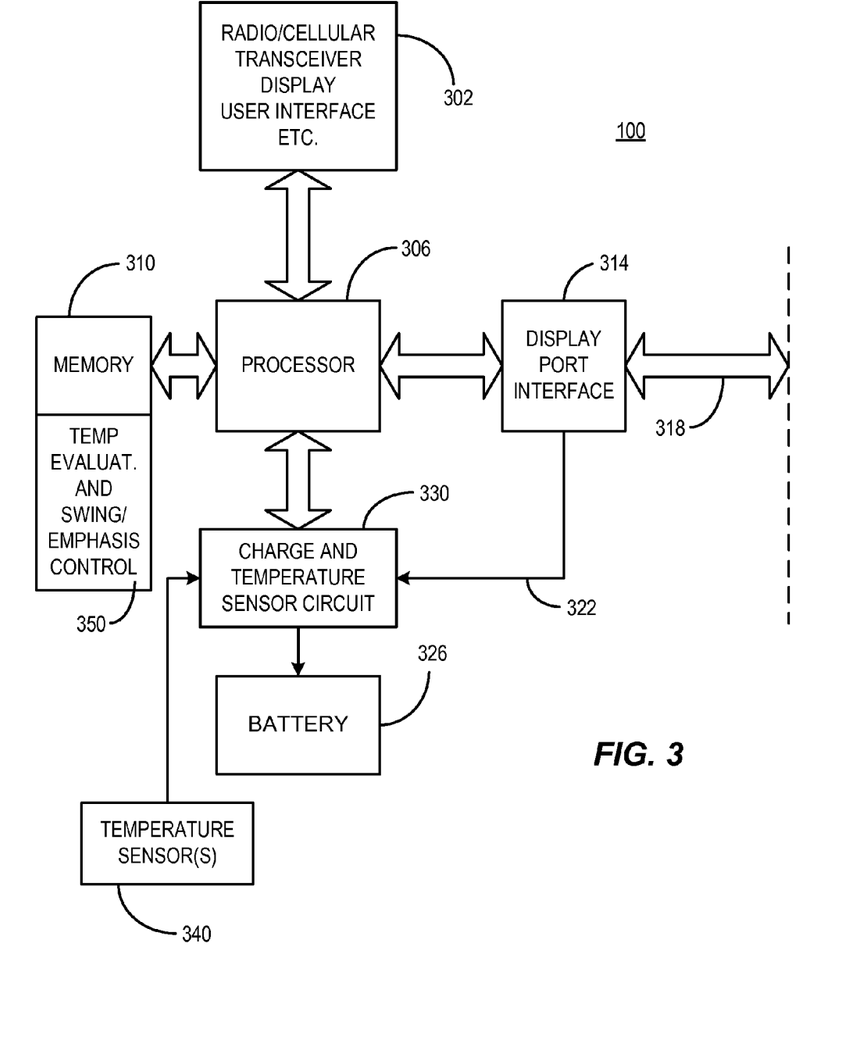
FIG. 3 is an illustration of an illustrative block diagram of a device such as device 100 in the form of a smartphone or the like, consistent with certain implementations.

FIG. 3 is an illustration of an illustrative block diagram of a device such as 100 in the form of a smartphone or the like, consistent with certain illustrative source device implementations of the present teachings. In this implementation, many conventional components are depicted as 302 in connection with the circuitry normally associated with such devices including a display, radio/cellular transceiver, network interfaces, wired or wireless adapters, user interface, expansion interfaces, and the like for brevity. Such circuitry operates under control of one or more programmed processors represented by processor 306, which has associated memory 310.

The device 100 is equipped with a display port interface 314 operating under control of the processor 306 and has a bus connection 318 to a physical connector (not shown) to interface to devices outside the bounds of the device 100 (as represented by the dashed line). For the instances such as MyDP where the display port can provide external charging current to the device 100, there is a connection 322 to battery 326 via a charging and temperature sensing circuit 330. Temperature sensing circuit 330 receives data from one or more temperatures sensors 340 situated within the device 100's housing in order to detect the state of the temperature of operation of device 100 and its various components. In the event data from sensors 340 are in the form of analog data, the data may be converted to digital for processing locally at 330 and for communication to processor 306.

For ease of illustration, the various devices are depicted as connected by multiple bus or signal lines, but any suitable interconnection arrangement as is compatible with the particular physical devices and circuit arrangement can be used as will be appreciated by those skilled in the art upon consideration of the present teachings. Hence, the present illustrative embodiment is merely intended to be descriptive of the operative connections in device 100 and is not to be considered limiting.

As depicted in FIG. 3, the device 100 operates in a manner in which most circuit functional blocks are either monitored by or operate under control of processor 306, which may represent multiple processors and/or controllers. In operation according with embodiments of the present teachings, memory 310 includes programming stored in memory 310 as program module or routine 350 which incorporates the programming instructions that handle evaluation of temperature information gathered by sensor(s) 340 and provided to processor 306 via circuit 330. Program module 350 further, upon evaluation of the temperature information, compares such information to one or more threshold temperature values to determine if it is appropriate to change the swing and emphasis levels used by display port 314. When such changes are to be made, the processor 306 instructs the display port interface to change the combination of swing and emphasis to a new level responsive to the temperature exceeding one or more threshold values.

Figure 4:
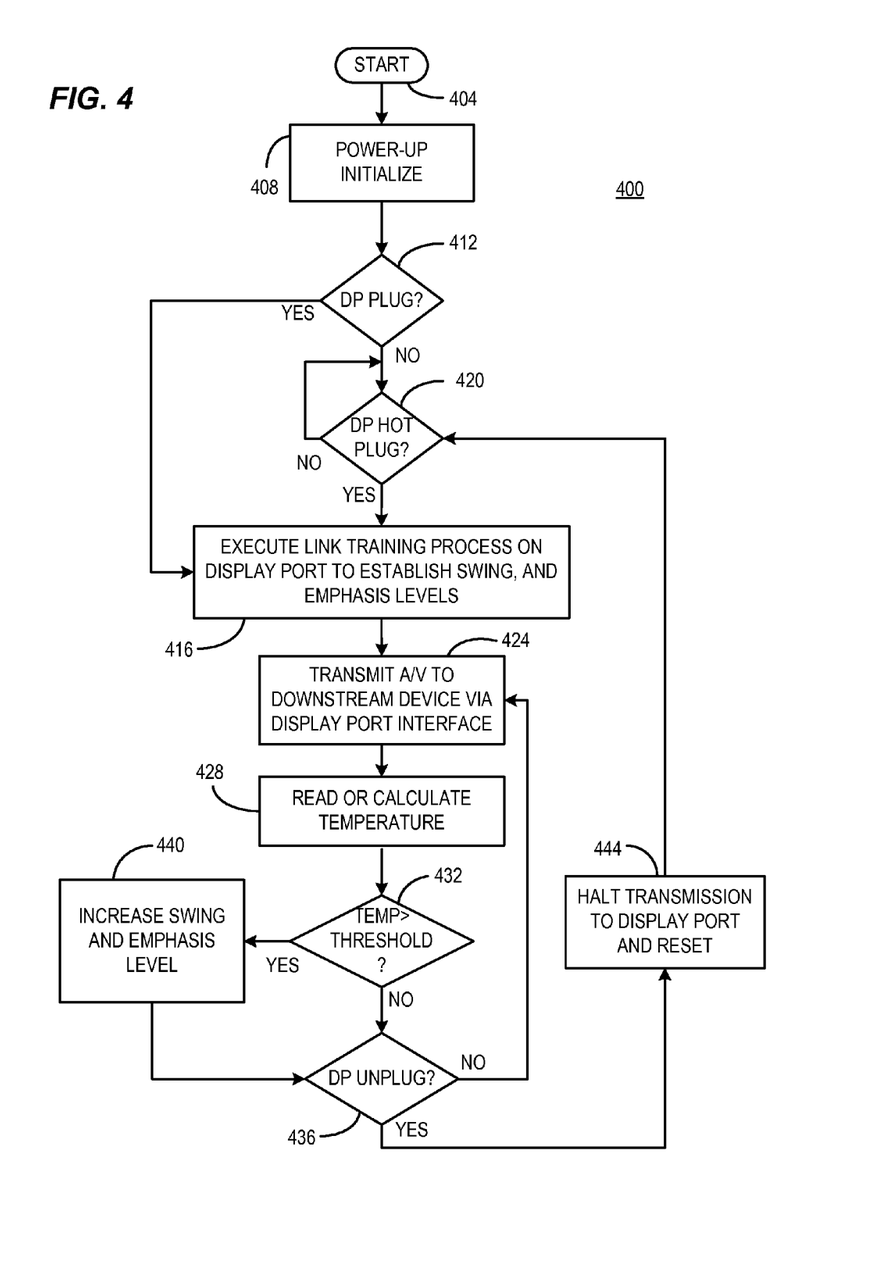
FIG. 4 is an example of a process that depicts an illustrative implementation consistent with the present teachings.

Referring now to FIG. 4, an illustrative process 400 that depicts an implementation consistent with the present teachings starting at 402 after which the device 100 is powered up and initialized at 408. Since the device may be connected to a display port at the time of power up, the display port is examined to see if a device is connected at 412. If so, the process proceeds to 416 which will be discussed further. But, if no display port is plugged in at 412, the device 100's processor 306 begins monitoring the display port at 420 to await a hot plug-in of a device to the display port.

In the event of either a hot plugged display port device at 420 or a device plugged in at power up at 412, control passes to 416 (in some cases as noted below by virtue of generation of a hot plug detect (HPD) event) where a link training process is carried out over the display port interface to synchronize the source and sink devices and to establish initial swing and emphasis levels. These levels are determined by the sink device and conveyed back to the source device with such levels being stored in memory 310 or other registers as TRAINING_LANEx_SET representing a register that holds the values representing the swing and emphasis levels that are to be set at the source device. This link training process as used in MyDP, for example, is generally described in the standards document and need not be addressed in detail here except to state that the output of the training includes a specified level of swing and emphasis from the sink device to be used by the source device for communication over the display port interface. The swing and emphasis levels are referred to herein by "Level X-Y" (or simply "X-Y") where "X" is the swing level and "Y" is the emphasis level as shown explicitly in the above TABLE for the case of Mobility DisplayPort. As a result of the link training process, clock recovery is carried out and an initial level of swing and emphasis are established for the conditions encountered in the link between the source and the sink during the training. Such conditions will include the current operating temperature, cable length and quality, and other factors that are present at the time of the training.

It is noted that in the case of DisplayPort compliant processes and similar, items 412 and 420 are essentially consolidated. In the case of DisplayPort, as the source device powers up, a DisplayPort manager process starts and generates a hot plug detect (HPD) event. Hence one interpretation is that there is no actual check for an existing plugged in display port device, per se, as shown in 412 and this function can be considered to be consolidated with the action of 420 where the action of a hot plug-in causes generation of the same HPD event. Those skilled in the art will appreciate that in compliance with other display connections, the process may be either consolidate operations or may operate as depicted in process 400.

Once link training has been completed, the process proceeds to 424 where actions such as streaming A/V data downstream to the sink device via the display port interface are carried out. However, as the source device 100 charges (potentially) and carries out other actions that may include streaming A/V signals to the target device, the temperature of the device 100 is likely to increase as noted above. Hence, the program 350, periodically or otherwise under program control, checks the temperature of the device 100 at 428. This can be accomplished either by reading information from the one or more temperature sensors or deriving data related to temperature from calculations relating to charge rate, processor activity, memory usage, etc. This process is depicted as a temperature measurement or calculation embedded within a loop, but may be initiated using any other suitable mechanism including by doing a temperature comparison at the temperature sensor circuit 330 and carrying out an interrupt when a threshold is exceeded. In any event, once the temperature is obtained (or a proxy for temperature is derived) at 428, this value is compared to a threshold value at 432 to see if the temperature has exceeded a level that has been determined likely to impact performance of the transmission over the display port interface to provide reliable communication with the target device.

If the temperature has not exceeded the threshold at 432, and the display port is still connected to a target device at 436, then control returns to 424 and the process repeats (e.g., after a suitable delay of several seconds or minutes). However, if the temperature has exceeded the threshold at 432, control passes to 440 where the processor 306 under control of program 350 instructs the display port 314 to increases the level of the combination of swing and emphasis used to communicate with the sink device. This can be accomplished in several ways which will be discussed via illustrative embodiments to follow.

In one such embodiment, any time the threshold is exceeded, the display port can be set immediately to the maximum combination of swing and emphasis available (e.g., Level 2-1 for example in MyDP for a high level with universal compatibility). In such an embodiment, there is no need to continue to check the temperature at 432 and that portion of the processing can be bypassed (not shown), or the threshold can be reset to a level that will never be reached so as not to repeatedly attempt to reset the swing and emphasis. Many variations will occur to those skilled in the art upon consideration of these teachings.

When the temperature fails to exceed the threshold at 432, the process can periodically check to see if the display port is still connected at 436 and if so, the process loops back to 424. If the display port is determined to be unplugged at 436, the device 100 can halt transmission by the display port and reset the port if such is called for by the standard at 444. The process then returns to 420 to await the next hot plug of a display port device.

Figure 5:
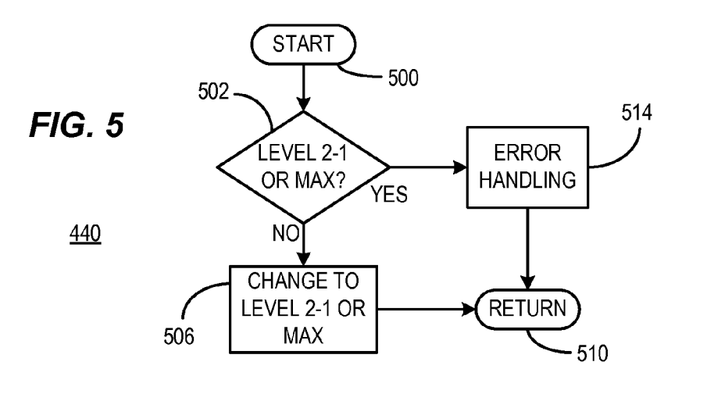
FIG. 5 is an illustration of a process that is used to implement action 440 of FIG. 4 in a manner consistent with certain implementations.

The embodiment in which the process goes to Level 2-1 as discussed briefly above is illustrated in FIG. 5 starting at entry point 500. After this, the process determines if the level of swing and emphasis is at Level 2-1 (for MyDP) or otherwise at a maximum set of levels at 502. If not, the process directs that the level be increased to Level 2-1 (or the maximum) at 506 and the process returns at 510. However, if the level is Level 2-1 or the maximum at 502, control passes to a suitable error handling process 514, where for example, the routine can be shut down rather than iterate further in one illustrative embodiment. In another, the data flow can be examined to assure that the communication is still reliable and continue communication as long as possible at the maximum level set unless the error rate increases to an unacceptable degree. In other instances, actions can be undertaken to reduce the temperature (e.g., reduce a battery charge rate). In still other embodiments, the process can return to 416 where a new link training process can be invoked in an effort to optimize transmission and reception quality. Other variations will occur to those skilled in the art upon consideration of the present teachings.

Figure 6:
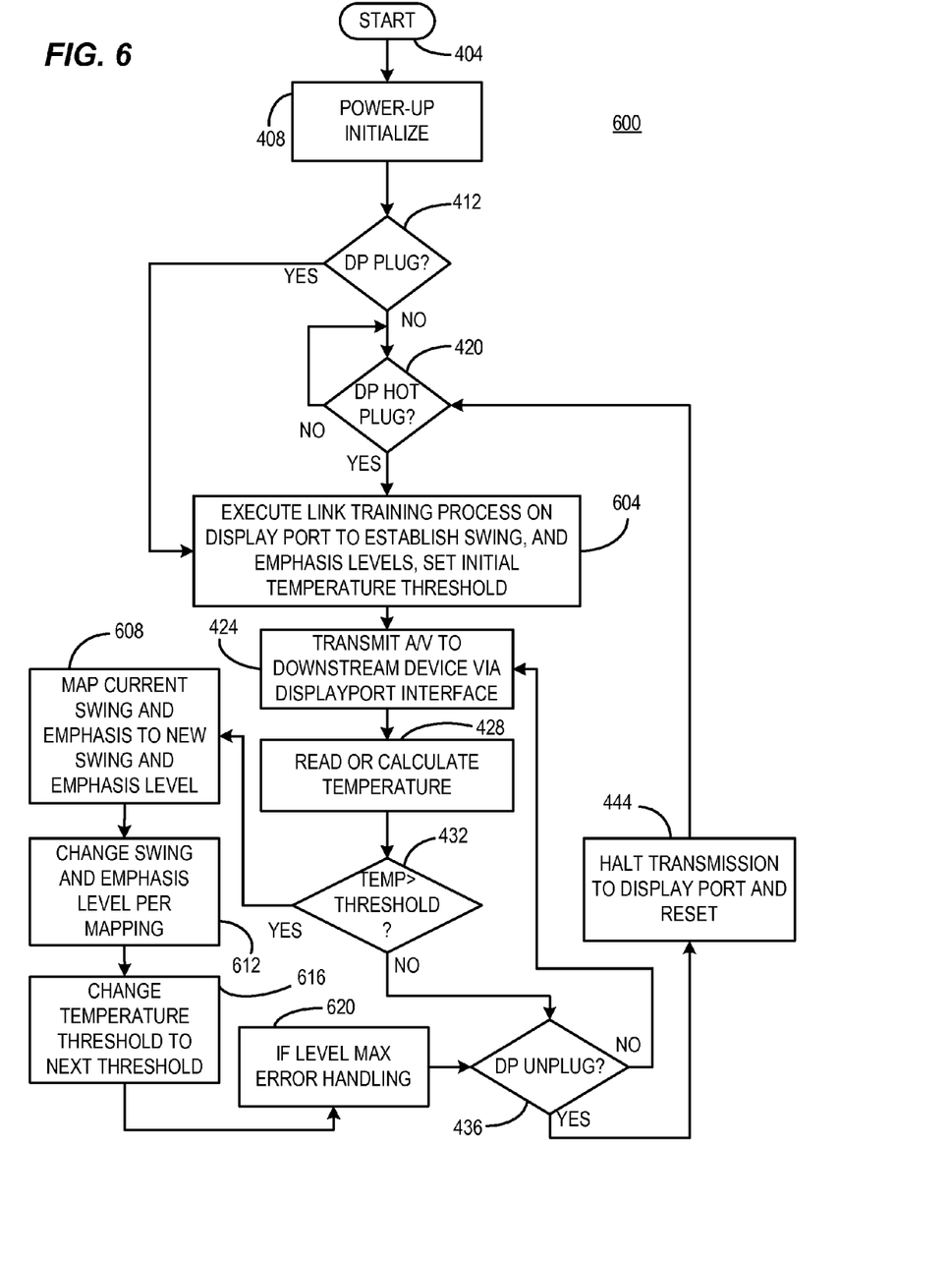
FIG. 6 is an illustration of a process that implements action 440 by use of a mapping in an implementation consistent with the present teachings.

Referring now to FIG. 6, an illustration of a process 600 that implements action 440 of FIG. 4 by use of a mapping in an implementation consistent with the present teachings operates in the same manner as discussed in connection with process 400 except that an initial temperature threshold is set at 604 in addition to the link training. Operation 440 is replaced by 608, 612, 616 and 620 and operation 416 is modified to 604 in this embodiment.

Once this temperature threshold set at 604 is reached at 432, control passes to 608 where the processor 306 references a map stored in memory 310 and enters the map at the current swing and emphasis setting to obtain a new swing and emphasis setting (generally higher in at least one or the other of swing and emphasis). The swing and emphasis levels are then installed for use by the interface 314 at 612 and the threshold is changed to a higher threshold at 616. The swing and threshold levels are checked at 620 to determine if the max has been reached (e.g., Level 2-1 for MyDP) and if so, error handling can be invoked to stop the temperature checks or take other actions (as with 514 as discussed previously) before returning to the process at 436. In this manner, the swing and emphasis levels can be incremented with rising temperature by reference to a stored mapping. The threshold can be changed to a new threshold by reference to a stored sequence of thresholds or by calculation (as a non-limiting illustration: initial threshold=40 Degrees C. or the like, and new threshold=prior threshold+5 Degrees C. or the like).

Figure 7:
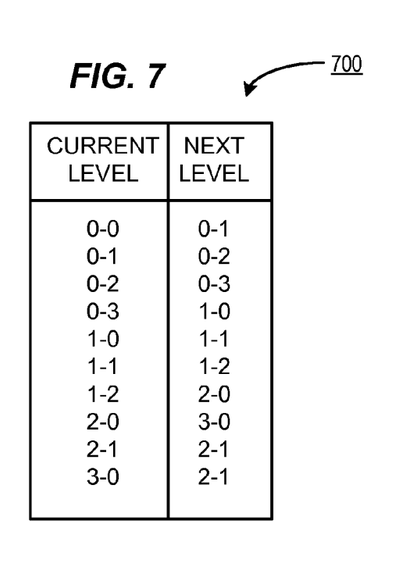
FIG. 7 is an illustration of a one to one mapping of current levels to next levels consistent with certain implementations of the present teachings.

Several different variations can be used for the mapping as depicted first in FIG. 7 as map 700. This map is depicted purely for illustrative purposes and shows a one to one correlation between the current level that is used as an entry point to the map and a next level which is used to set the updated level at 612 of FIG. 6. This table contrasts what amounts to a many (all) to one (Level 2-1) mapping in the process 500 of FIG. 5. It should be carefully noted that this table is developed with very preliminary data and some level of intuitive selection and may not reflect the optimum mapping, but can be used as a reasonable starting point for experimentally and empirically devising a similar table used to map the various swing and emphasis levels to a level that is expected to provide improved reliability in communication over the display port. Further this mapping assumes all optional levels are available. Hence, the exact mappings shown should not be considered limiting and are only presented by way of illustration of a one to one mapping implementation. This mapping may be altered to provide other mappings without limitation.

Figure 8:
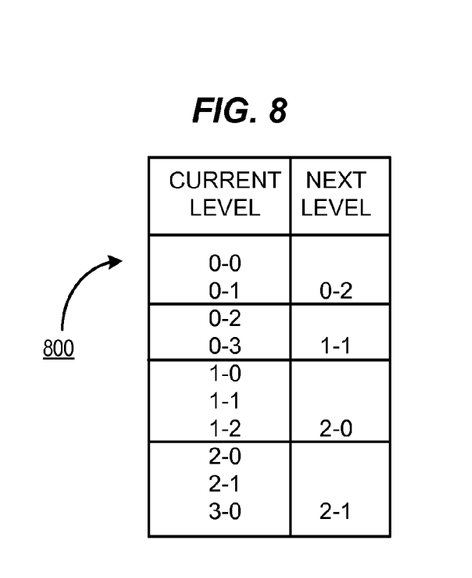
FIG. 8 is an illustration of a many to many mapping of current levels to next levels consistent with certain implementations of the present teachings.

Similarly, FIG. 8 depicts a map 800 that can provide a many-to-many mapping that is simpler to implement. In this map, the current level entries are divided into four categories so that any of several current levels are mapped to a single level for use as the updated level at 612 of FIG. 6. This is simpler to implement than mapping 700, but more complex than simply jumping to the highest level as shown in FIG. 5. This table is also developed with very preliminary data and may not reflect the optimum mapping, but can similarly be used as a reasonable starting point for experimentally and empirically devising a similar table used to map the various swing and emphasis levels to a level that is expected to provide improved reliability in communication over the display port in a many to many mapping. Further, this map also presumes the availability of all optional Levels. Hence, the exact mappings shown should not be considered limiting and are only presented by way of illustration of a many to many mapping scenario. Moreover, while four Next Levels are depicted, the mapping can be modified to provide two or three Next Levels or five or more Next Levels without limitation.

Figure 9:
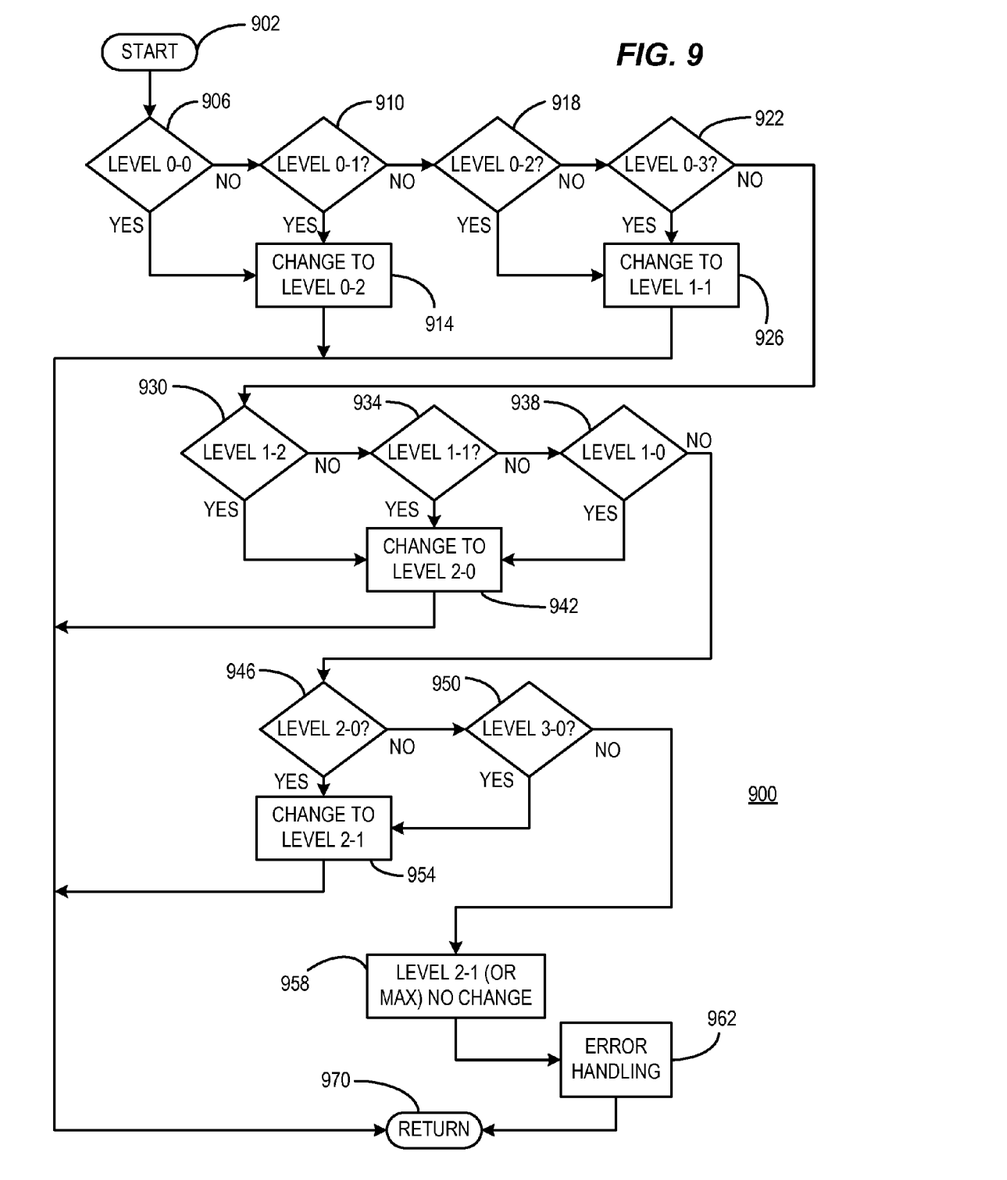
FIG. 9 is an illustrative flow chart of a decision tree used for identifying a next level based on a current level in a manner consistent with certain implementations of the present teachings.

One skilled in the art will also appreciate that the process can utilize a decision tree rather than a mapping as depicted in FIG. 9 as illustrative process 900. This process is equivalent to the process that uses the mapping of map 700, but implemented by a process that traverses a decision tree starting at 902. After 902, the process sequentially compares the current swing and emphasis level with all available levels. If the current level is 0-0 or 0-1 at 906 or 910 respectively, the process changes the level to 0-2 at 914. Similarly, if the current level is 0-2 or 0-3 at 918 and 922, the process changes the level to 1-1 at 926. Similarly, if the current level is 1-2 or 1-1 or 1-0 at 930 or 934 or 938 respectively, the process changes the level to 2-0 at 942. If the current level is at 2-0 or 3-0 at 946 or 950 respectively, the level is changed to (or retained at) 2-1 (or the maximum) at 954. In the case where the level is already at the maximum 2-1 at 958, error handling as discussed previously is invoked at 962 before returning at 970. Again, this decision tree is another implementation of the mapping of mapping table 800, and is also developed with very preliminary data and may not reflect the optimum decision. However, this decision tree is illustrative of a decision tree implementation and can be used as a reasonable starting point for experimentally and empirically devising a similar decision tree for changing the various swing and emphasis levels to a level that is expected to provide improved reliability in communication over the display port. Hence, the exact decision tree depicted should not be considered limiting and is only presented by way of illustration of such an implementation.

Many variations are possible in the error recovery process as described. In addition to those actions discussed above, if there is no ongoing A/V streaming then the display port driver can be instructed to fake a hot plug detect (HPD) event and cause the service to start from scratch with a new link training. This, for example, would be equivalent to jumping from 514 in FIGS. 5 to 416 in FIG. 4. This would invoke the link training and allow it to train to a level that may work acceptably well with the current level of heat. In another possibility, the processor could bypass a request from the sink device's selection during training and select the set of levels preferred by the source. Other variations will occur to those skilled in the art upon consideration of the current teachings.

As noted above, the temperature can be measured directly by use of one or more temperature sensors (e.g., thermisters) within device 100. But, a proxy for the actual temperature can also be devised by measuring various parameters and performing a calculation that closely relates to temperature. One illustrative embodiment includes the use of charging current and time with the knowledge that high charging rates lead to substantial temperature increases. Therefore, if one wishes to calculate a temperature proxy $T_P$ based on charging current, there are several possibilities such as the following non-limiting embodiments.

In one embodiment, a proxy for temperature $T_P$ may be assumed to equal a charge rate times the charging time for a constant and high charge rate when it is determined that a device relatively consistently starts produce jitter or errors when rapid charged for a specified time. Hence, a temperature can be presumed to be related to I*t, where I is current and t is time. So, $T_P=I*t$ and this value can be used in place of temperature in the process previously described and is to be considered a calculated temperature for the purposes of the present document without regard for actual units (in this case Amp Hours or the equivalent). Additionally, the current used in this calculation can be an average current over the time period.

In another illustrative embodiment, when a charging current varies as the device's battery charges, the temperature proxy $T_P$ can be assumed to be the area under a curve of current time. Thus, another $T_P$ is given by: $T_P=\int_0^t I(t)dt$ and this value can be used in place of temperature in the process previously described and is to be considered a calculated temperature for the purposes of the present document without regard for actual units.

In another exemplary implementation, the charge current itself can be used as a proxy for temperature. For example, if the device is sinking two amps of charge current, the level can be increased by one step, but if the device is sinking three amps the level can be increased to the maximum.

Other factors that result in generation of substantial amounts of heat include transmit and receive time, A/V streaming rate and time, network data download and upload, applications (apps), memory access, etc. These elements that generate heat can be characterized and added to the temperature proxy based on charge rate and time and used to determine a final temperature proxy with smaller contributors ignored or factored in as desired. This temperature proxy value can then be compared with a threshold temperature proxy value established for the purpose of comparison with the temperature proxy with other operations remaining essentially the same. Those skilled in the art will appreciate that may other variations are possible upon consideration of the present teachings.

It is noted that each type of device such as device 100 will have its own temperature profile that is dependent on the type and configuration of batteries, power output, circuit layout and many other parameters. Hence, the present disclosure can only provide general guidance as it may relate to other devices. Thus, one implementing the present teachings should conduct experiments to determine how the device in question behaves at various temperatures and develop the details of the implementation based on this information.

In accordance with certain prototypes used in the development of the present subject matter, a temperature threshold of about 62 Degrees Celsius was determined to be suitable for a transition from the trained swing and emphasis levels to level 2-1. However, it is to be carefully noted that this determination was made with a prototype device in laboratory temperature chamber conditions. The actual thresholds used in any particular device will vary significantly depending upon the circuit layout, location of temperature sensors, circuit configuration, temperature sensitivity of the circuitry, etc. So, while 62 degrees C. was found to be suitable in this prototype, this should only be considered to be a point of reference for determining empirically and/or experimentally the particular threshold that should be used in any particular commercial device. Moreover, one may take this as basic guidance for development of a stepwise approach where multiple steps are taken in selection of swing and emphasis levels based upon multiple temperature thresholds.

In an illustrative embodiment, if three steps are taken in swing and emphasis levels, one may find that the temperature thresholds may be set at 40, 50 and 60 degrees C.; or, one may find that 50, 55 and 60 degrees C. are suitable. Suitable values of temperature thresholds may be obtained by experimentation and empirical methods.

As stated above, this should only be considered a starting point since different devices will behave in different ways and the temperature threshold(s) should be individualized to work properly with each particular hardware device.

Figure 10:
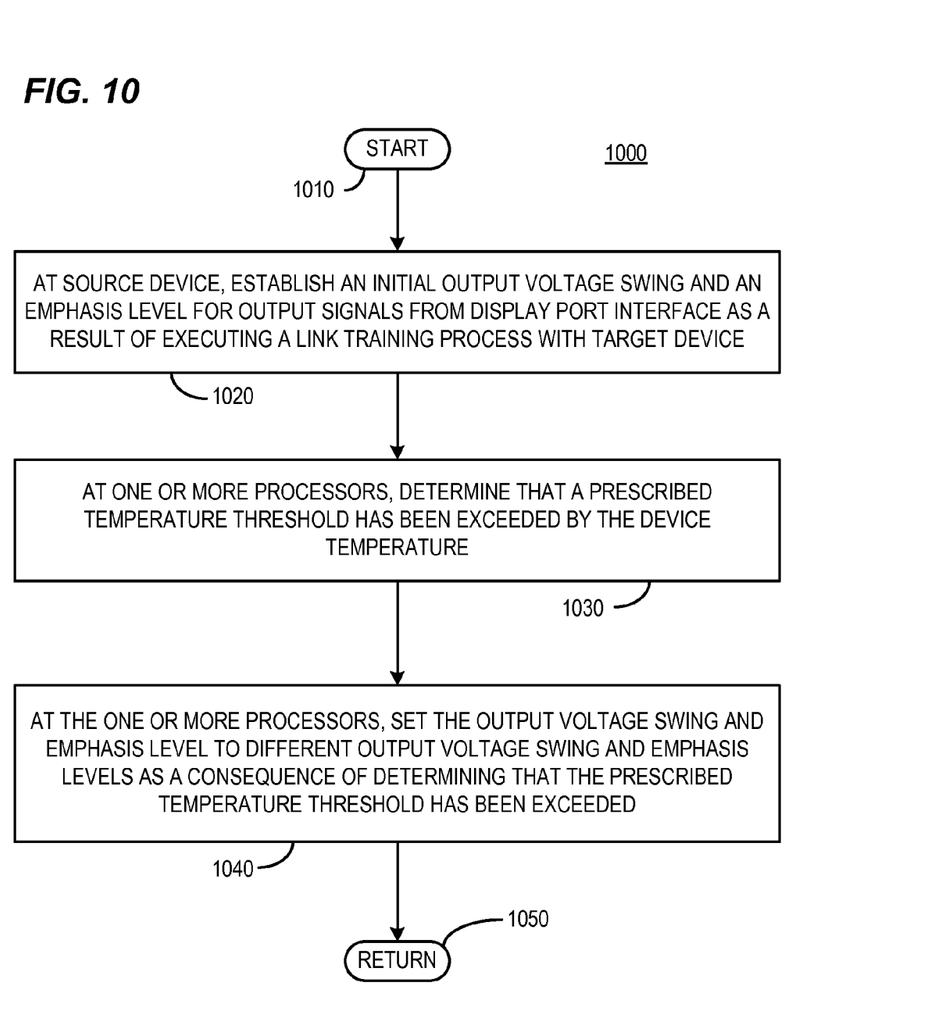
FIG. 10 is an illustrative flow chart of an overall process consistent with the present teachings.

Thus, in accordance with certain implementations consistent with the present teachings, an illustrative process is depicted as process 1000 of FIG. 10 starting at 1010 and involves at a source device, establishing an initial output voltage swing and an emphasis level for output signals from a display port interface as a result of executing a training process with a target device at 1020. The process further, at one or more processors, determines that a prescribed temperature threshold has been exceeded by a device temperature at 1030. The process further, at the one or more processors, sets the output voltage swing and emphasis level to different output voltage swing and emphasis levels as a consequence of determining that the prescribed temperature threshold has been exceeded at 1040. The process returns at 1050. Many variations will occur to those skilled in the art upon consideration of the present teachings.

The order in which the operations represented in the processes described herein occur is not necessarily predetermined or predefined, and these operations may occur in any operational order. Thus, while the blocks depicting the methods are shown as occurring in a particular order, it will be appreciated by those skilled in the art that many of the blocks may be interchangeable and can occur in different orders than that shown without materially affecting the end results of the methods.

For example, the order in which the operations represented by 930, 934 and 938 are of little consequence, and these operations may occur in any order. Thus, while the blocks representing the methods are shown as occurring in a particular order, it will be appreciated by those skilled in the art that many of the blocks are interchangeable and can occur in different orders than that shown without materially affecting the end results of the methods.

The implementations of the present disclosure described above are intended to be illustrative embodiments only. Those of skill in the art can effect alterations, modifications and variations to the particular illustrative embodiments herein without departing from the intended scope of the present disclosure. Moreover, selected features from one or more of the above-described illustrative embodiments can be combined to create alternative embodiments not explicitly described herein.

It will be appreciated that any module or component disclosed herein that executes instructions may include or otherwise have access to non-transitory and tangible computer readable media such as storage media, computer storage media, or data storage devices (removable or non-removable) such as, for example, magnetic disks, optical disks, or tape data storage, where the term "non-transitory" is intended only to exclude propagating waves and signals and does not exclude volatile memory or memory that can be rewritten. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method, comprising:
   at a source device, establishing an initial level for an output voltage swing level and an initial emphasis level for output signals from a display port interface as a result of executing a link training process with a target device;
   receiving, by the display port interface, a charging current and providing the charging current to a battery of the source device so as to charge the battery at an initial charge rate;
   at one or more processors, determining that a prescribed temperature threshold has been exceeded by a source device temperature of the source device; and
   at the one or more processors, responsive to determining that the prescribed temperature threshold has been exceeded, setting the output voltage swing and emphasis level to different output voltage swing and emphasis levels;
   at the one or more processors, determining that the emphasis level and the output voltage swing level are at a maximum set of levels; and
   responsive to determining that the emphasis level and the output voltage swing level are at the maximum set of levels, reducing the charge rate of the battery.

2. The method in accordance with claim 1, where the different output voltage swing and emphasis levels comprise a maximum output voltage swing and emphasis levels permitted by an interface of the target device.

3. The method in accordance with claim 1, where the different output voltage swing and emphasis levels are selected by reference to a map stored in a memory, and where a map entry point comprises the initial level for the output voltage swing and emphasis levels.

4. The method in accordance with claim 1, where the different output voltage swing and emphasis levels are selected by traversing a decision tree.

5. The method in accordance with claim 1, where the prescribed temperature threshold comprises a prescribed one of a plurality of temperature thresholds; and where the different output voltage swing and emphasis levels comprise one of a plurality of selectable output voltage swing and emphasis levels, with each of the plurality of selectable output voltage swing and emphasis levels being incrementally larger in either swing or emphasis level than the initial level for the output voltage swing and emphasis level.

6. The method in accordance with claim 1, where the display port interface comprises a Mobility DisplayPort physical layer, swing and emphasis compliant display port interface.

7. The method in accordance with claim 6, where the different output voltage swing and emphasis levels comprise an output voltage swing of approximately 600 millivolts nominal, and the emphasis level comprises approximately 3.5 dB nominal.

8. The method in accordance with claim 1, where the different output voltage swing and emphasis levels comprise an output voltage swing of approximately 600 millivolts nominal, and the emphasis level comprises approximately 3.5 dB nominal.

9. The method in accordance with claim 1, where the source device temperature comprises a temperature measured by one or more temperature sensors.

10. The method in accordance with claim 1, where the source device temperature comprises a calculated temperature proxy value, and where the temperature threshold comprises a temperature threshold proxy value.

11. A source device, comprising:
a battery;
a display port interface configured to receive a charging current and to provide the charging current to the battery so as to charge the battery at an initial charge rate;
one or more processors controlling operation of the display port interface;
the one or more processors being programmed to:
establish an initial level for an output voltage swing and an emphasis level for output pulse signals from the display port interface as a result of executing a link training process with a target device;
determine that a prescribed temperature threshold has been exceeded by a source device temperature;
set the output voltage swing and emphasis level to different output voltage swing and emphasis levels responsive to determining that the prescribed temperature threshold has been exceeded; and
determine that the emphasis level and the output voltage swing level are at a maximum set of levels;
the source device being configured to reduce the charge rate of the battery responsive to determining that the emphasis level and the output voltage swing level are at the maximum set of levels.

12. The device in accordance with claim 11, where the different output voltage swing and emphasis levels comprise maximum output voltage swing and emphasis levels permitted by an interface of the target device.

13. The device in accordance with claim 11, where the different output voltage swing and emphasis levels are selected by reference to a map stored in a memory, and where a map entry point comprises the initial output voltage swing and emphasis levels.

14. The device in accordance with claim 11, where the different output voltage swing and emphasis levels are selected by traversing a decision tree.

15. The device in accordance with claim 11, where the prescribed temperature threshold comprises a prescribed one of a plurality of temperature thresholds; and where the different output voltage swing and emphasis levels comprise one of a plurality of selectable output voltage swing and emphasis levels, with each of the plurality of selectable output voltage swing and emphasis levels being incrementally larger in either swing or emphasis level than the initial level for the output voltage swing and emphasis.

16. The device in accordance with claim 11, where the display port interface comprises a Mobility DisplayPort physical layer, swing and emphasis compliant display port interface.

17. The device in accordance with claim 16, where the different output voltage swing and emphasis levels comprise an output voltage swing of approximately 600 millivolts nominal, and the emphasis level comprises approximately 3.5 dB nominal.

18. The device in accordance with claim 11, where the different output voltage swing and emphasis levels comprise an output voltage swing of approximately 600 millivolts nominal, and the emphasis level comprises approximately 3.5 dB nominal.

19. The device in accordance with claim 11, where the source device temperature comprises a measured temperature measured by one or more temperature sensors.

20. The device in accordance with claim 11, where the source device temperature comprises a calculated temperature proxy value, and where the temperature threshold comprises a temperature threshold proxy value.

21. A source device, comprising:
a battery;
one or more temperature sensors;
a DisplayPort physical layer, swing and emphasis compliant display port interface configured to receive charging current and to provide the charging current to a battery;
one or more processors controlling operation of the display port interface, the display port interface configured to receive a charging current and to provide the charging current to the battery so as to charge the battery at an initial charge rate;
the one or more processors being programmed to:
establish an initial level for an output voltage swing and an emphasis level for output pulse signals from the display port interface as a result of executing a link training process with a target device;
determine that a prescribed temperature threshold has been exceeded by a source device temperature as measured by the one or more temperature sensors;
set the output voltage swing and emphasis level to different output voltage swing and emphasis levels as a consequence of determining that the prescribed temperature threshold has been exceeded, and
determine that the emphasis level and the output voltage swing level are at a maximum set of levels;
the source device being configured to reduce the charge rate of the battery responsive to determining that the emphasis level and the output voltage swing level are at the maximum set of levels.

* * * * *